United States Patent [19]

Little

[11] Patent Number: 5,323,512
[45] Date of Patent: Jun. 28, 1994

[54] HINGE

[75] Inventor: John B. Little, Church Aston, United Kingdom

[73] Assignee: ITW Limited, Windsor, England

[21] Appl. No.: 963,360

[22] Filed: Oct. 20, 1992

[30] Foreign Application Priority Data

Oct. 24, 1991 [GB] United Kingdom ............... 9122616

[51] Int. Cl.⁵ ............................................. E05D 11/10
[52] U.S. Cl. ....................................... 16/332; 16/275; 16/334
[58] Field of Search ............... 16/275, 334, DIG. 27, 16/DIG. 33, 91, 106, 107, 313, 314, 315, 344, 321, 327, 332; 74/569

[56] References Cited

U.S. PATENT DOCUMENTS

| | | | |
|---|---|---|---|
| 4,472,857 | 9/1984 | Guionie et al. | 16/344 |
| 4,672,715 | 6/1987 | Beckwith | 16/334 |
| 4,771,507 | 9/1988 | Draplin et al. | 16/332 |
| 4,800,856 | 1/1989 | Baltz et al. | 74/569 |
| 4,932,101 | 6/1990 | Lualdi | 16/334 |
| 4,987,638 | 1/1991 | Ribaudo | 16/106 |
| 5,018,243 | 5/1991 | Anspaugh et al. | 16/335 |
| 5,165,142 | 11/1992 | Pilsbury | 16/91 |

FOREIGN PATENT DOCUMENTS

| | | | |
|---|---|---|---|
| 60-201162 | 10/1985 | Japan | 74/569 |
| 515603 | 12/1939 | United Kingdom | 16/107 |

Primary Examiner—Lowell A. Larson
Assistant Examiner—Donald M. Gurley
Attorney, Agent, or Firm—Schwartz & Weinrieb

[57] ABSTRACT

A hinge is described having first and second members for respective attachment to two components to be hingedly interconnected. A movement arrestor is provided which serves as a check on the hinging movement of the two hinge members. The arrestor comprises a cam surface on the first hinge member and a roller mounted on the second hinge member. The roller is resiliently displaceable relative to the second member to force the roller into engagement with the cam surface so as to provide the desired check. In accordance with the invention the roller includes a polymer sleeve with which it engages the cam surface, to absorb and thereby reduce the noise and to reduce the wear produced as the roller moves over the cam surface as the hinge is opened and closed. The sleeve material may be PTFE or Nylon and may be snap fitted over the roller and may include an axial slot. The roller and cam surface are conveniently formed from metal.

26 Claims, 3 Drawing Sheets

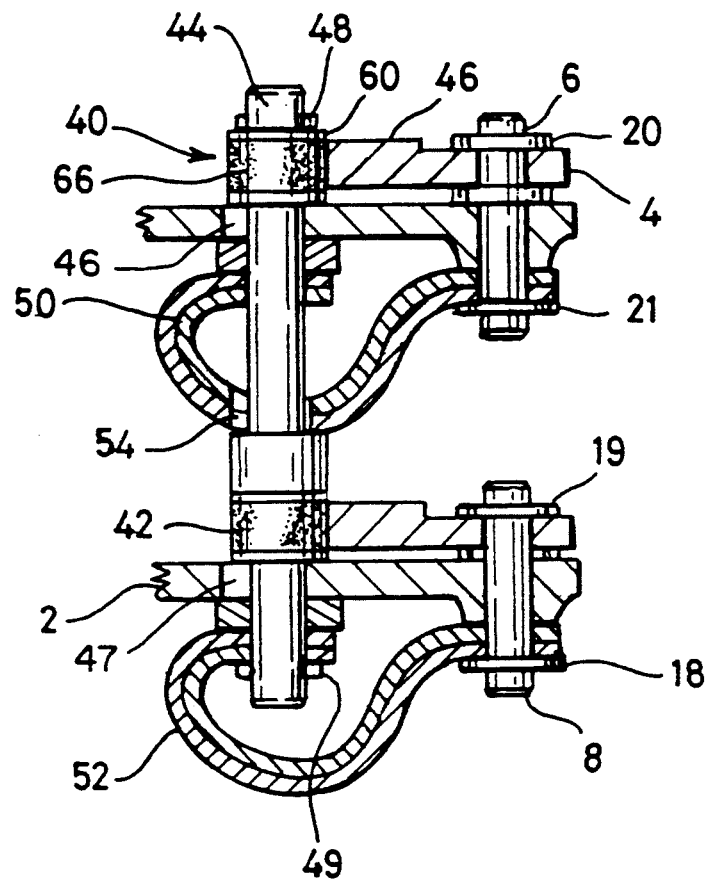
Fig. 4
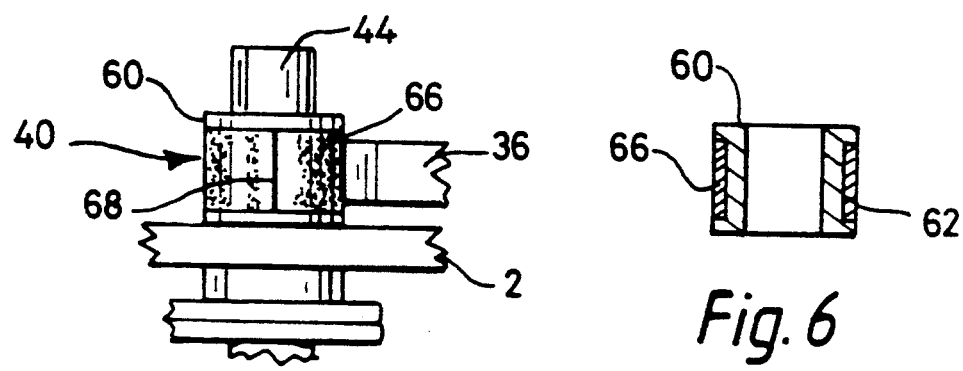
Fig. 5
Fig. 6

HINGE

FIELD OF THE INVENTION

The invention relates to a hinge, and more specifically to a hinge having a movement arrestor serving as a check on the hinging movement. The invention is particularly applicable to a vehicle door hinge.

BACKGROUND TO THE INVENTION

It is known to provide a vehicle door hinge in which the hinging action of the door is checked, at an intermediate point in its opening movement, by a movement arrestor. Two examples of vehicle door hinges having such movement arrestors are described in the present applicants' European Patent Application No 87311085.2 (Publication No 275672), and co-pending UK Patent Application No 9112545.0.

In both cases, the movement arrestor mechanism (of the specific embodiment) comprises a cam surface on one hinge member and a roller mounted on the other hinge member by means of one or more springs which, in use, urge the roller against the cam surface. With the hinge in the intermediate check position, the roller engages a portion of the cam surface between two high points so that movement of the hinge out of the check position displaces the roller against the action of the spring means.

If both the roller and the cam surface are metal, the engagement of the roller with the cam surface as the hinge is closed may create irritating noise. In addition, the engagement of the roller with the cam surface may lead to wear of either of those components which may limit the useful life of the hinge.

One version of the hinge described in European Patent Application No 87311085.2 employs a hardened nylon roller which may at least mitigate these problems. However, since the nylon roller is not as robust as a metal roller, it is not suitable for use in hinges which have to exert relatively large check producing forces.

SUMMARY OF THE INVENTION

According to the invention, there is provided a hinge having first and second hinge members for respective attachment to two components to be hingedly interconnected and a movement arrestor serving as a check on the hinging movement of the hinge members, the arrestor comprising a cam surface on the first hinge member and a roller mounted on the second hinge member, the roller being resiliently displaceable relative to the latter to enable the roller to engage the cam surface so as to provide the desired check, characterised in that the roller includes a polymer sleeve by means of which, in use, the roller engages the cam surface.

The sleeve thus provides a surface for engaging the cam surface which reduces the amount of noise produced as the roller travels over the cam surface. In addition, the portion of the roller on which the sleeve is mounted may be formed of a material having a structural strength which provides the desired robustness for the roller.

Thus the invention may provide a hinge with a roller which has the durability and the advantages of quiet operation associated with a polymer roller, but has the robustness similar to that associated with a metal roller.

In the described embodiment, the roller has a PTFE sleeve. However, the sleeve may be of another polymer, for example hardened nylon.

Preferably the roller comprises a metal core on which the sleeve is mounted.

The core may with advantage be of a generally cylindrical shape with an annular rebate in which the sleeve is retained.

For ease of manufacture, the sleeve is preferably so shaped and sized relative to the core that the former may be snap fitted onto the latter.

To this end, the sleeve advantageously includes an axial slot.

Preferably the hinge is a vehicle door hinge.

BRIEF DESCRIPTION OF THE DRAWINGS

The invention will now be described, by way of example only, with reference to the accompanying drawings in which like reference characters designate like or corresponding parts throughout the several views, and wherein:

FIG. 4 is a sectional side view taken along the line 4—4 of FIG. 3b;

FIG. 5 is a detailed view of a roller forming part of the hinge; and

FIG. 6 is a sectional view of the roller taken along the line 6—6 of FIG. 3a.

DETAILED DESCRIPTION OF THE PREFERRED EMBODIMENTS

Figure 1:
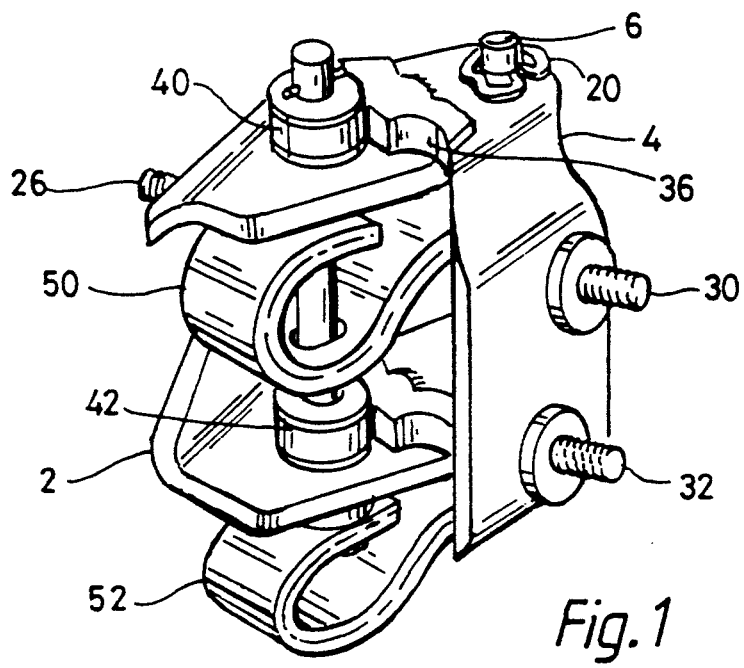
FIG. 1 is a perspective view of a hinge in accordance with the invention.
Figure 2:
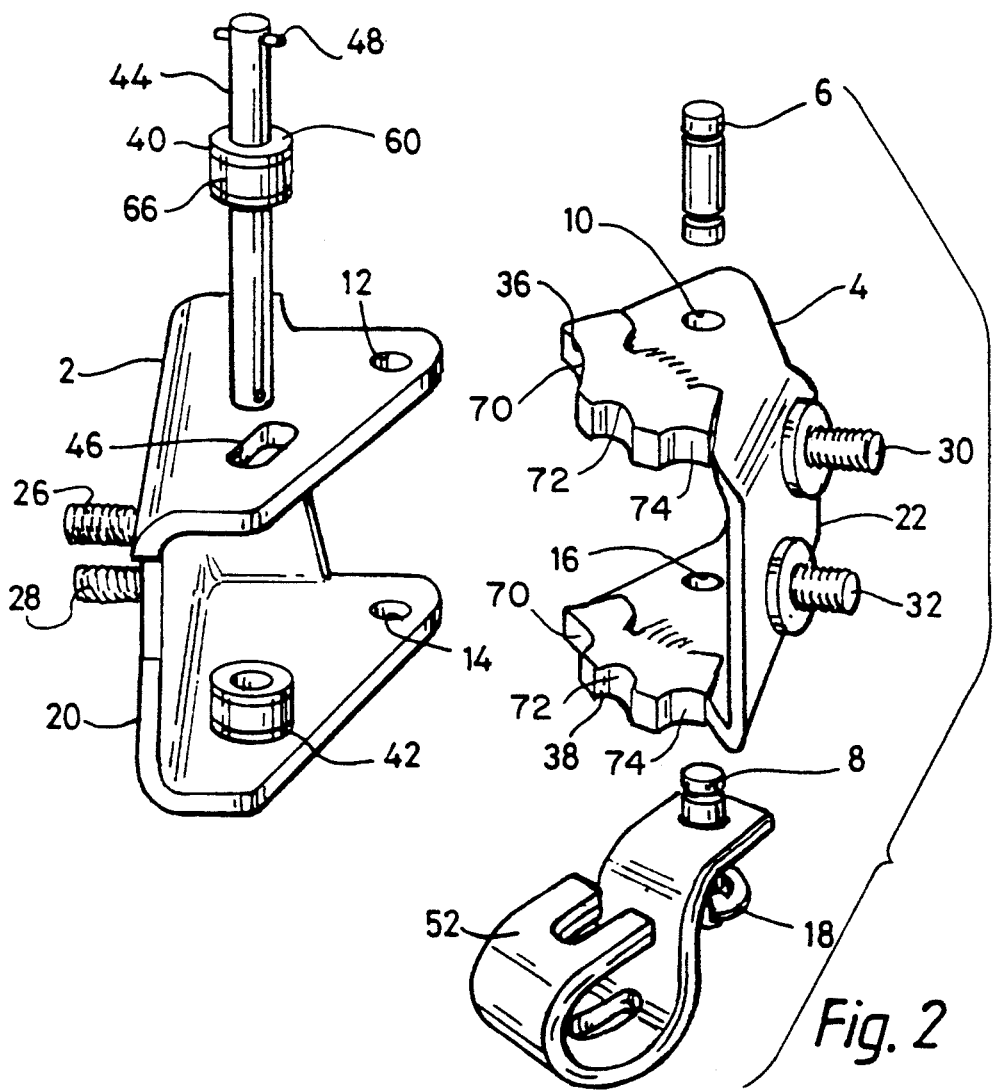
FIG. 2 is an exploded perspective view of certain components of the hinge of FIG. 1.

A hinge in accordance with the invention comprises two hinge members 2 and 4 pivotally connected by pivot pins 6 and 8, each of which extends through a registering pair of holes 10, 12 and 14, 16 in the hinge members. The pins 6 and 8 are each held in position by means of two circlips 18, 19 and 20, 21 (FIG. 4) provided one at each end of each respective pin.

The hinge members 2 and 4 each comprise a generally C-shaped housing having a base portion 20, 22 from which a pair of opposed flanges project. In use, the base 20 is connected to a vehicle body by means two screw threaded shafts 26 and 28, and the base 22 is similarly attached to a vehicle door by means of shafts 30 and 32.

Each side flange of the member 4 carries a cam surface 36, 38 which is engaged by a respective roller 40, 42.

The rollers 40 and 42 are rotatably mounted on a common axle 44, which extends through an elongate slot 46 in one of the flanges of the member 2, and a corresponding aligned elongate slot 47 FIG. 4 in the other flange of the member 2. The axle which is held in positions by means of pins 48, 49, may move within those slots, hence enabling the rollers 40 and 42 to be displaced relative to the member 2.

The axle 44, and hence the rollers 40 and 42 is urged towards the cam surfaces 36 and 38 by a spring 52 acting between the pin 8 and the axle 44, and by a spring 50 which is identical to the spring 52 save for an aperture 54 (FIG. 4) through which the axle 44 extends, and which is so sized as to accommodate the necessary motion of the axle 44.

With reference to FIGS. 5 and 6, the roller 40 comprises a metal core 60 having an annular rebate 62 in which a PTFE sleeve 66, which engages the cam surface 36, is retained. The roller 42 is of a similar construction.

The sleeve 66 includes an axial slot 68 and is resiliently flexible so that the effective diameter of the sleeve 66 may be varied over a limited range. Thus, when the sleeve 66 is to be fitted to the core 60 during assembly, the sleeve 66 is positioned in axial alignment of the core 60 and then deformed so as to fit over the end of the latter. When the sleeve 66 registers with the rebate 62, it is allowed to return to its original shape. Thus the sleeve 66 is resiliently "snap-fitted" onto the core 60.

The operation of the hinge will now be described with reference to FIGS. 3a and 3b. The roller 42 engages the surface 38 in the same way as the roller 40 engages the surface 36, and so the interaction of the rollers 40 and 42 with their respective cam surfaces will be described only with reference to the roller 40 and the surface 36.

Figure 3A:
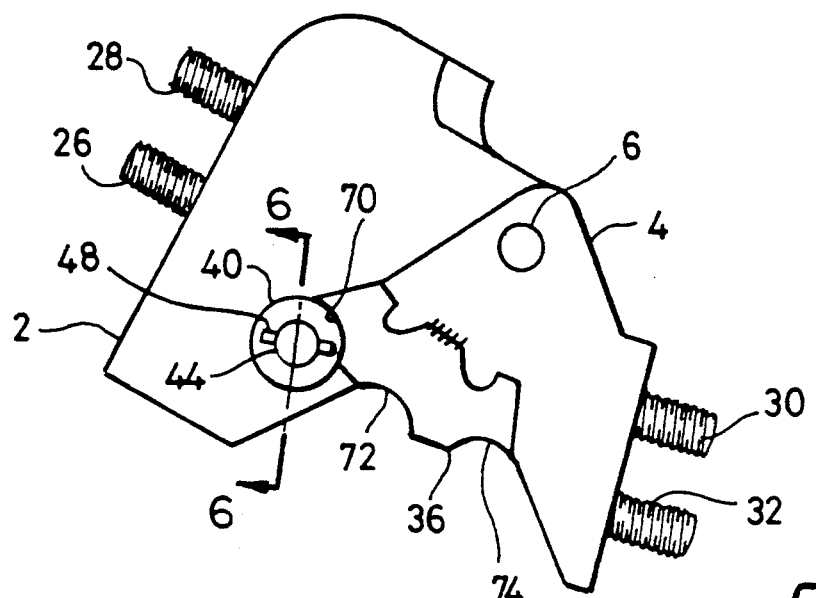
FIGS. 3a and 3b are plan views of the hinge respectively shown in its fully opened and fully closed positions.
Figure 3B:
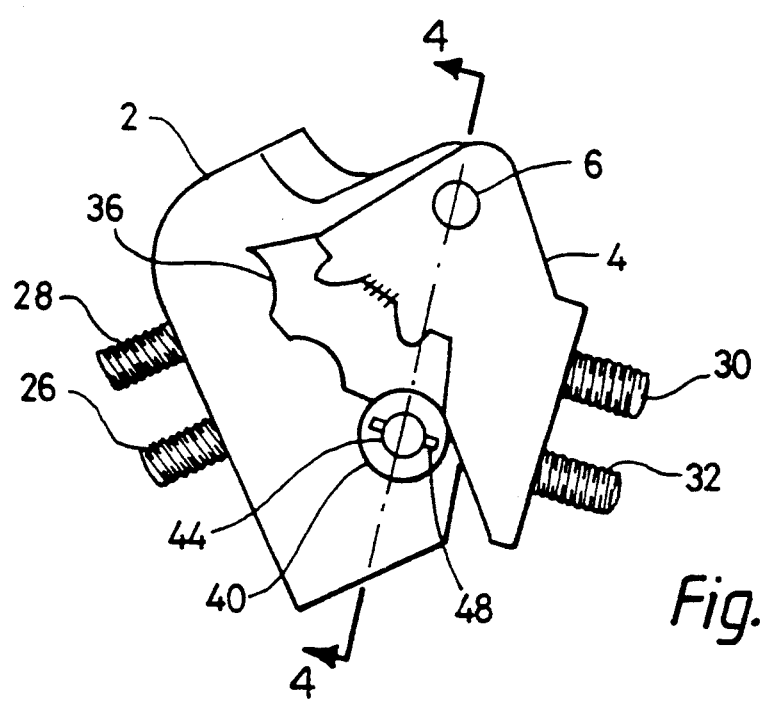

When the hinge is moved from the open position shown in FIG. 3a towards the closed position shown in position 3b the roller 40 is displaced out of a recess 70 in the surface 36, causing the axle 44 to move against the bias force exerted by the springs 50 and 52. As the hinge continues to close, the axle 44 moves in the opposite direction as the roller 40 enters a recess 72, at which stage the hinge is in an intermediate open position.

Movement of the hinge from the intermediate position to the fully closed position causes a similar movement of the axle 44 as the roller 40 travels from the recess 72 to the recess 74.

It will be seen that, depending upon the relative position of the hinge members 2 and 4, the springs 50 and 52 urge the hinge towards a position in which the roller 40 engages in one of the three recesses 70, 72 or 74.

Since the surface of the roller which engages the cam surface is provided by the polymer sleeve, the noise resulting from a metal against metal engagement is avoided. In addition, the relative durability of the sleeve 66 results in less wear on the engagement surface of the roller than would be the case if a metal surface were used.

The above described embodiment includes a lift-off facility whereby the hinge members may be relatively detached from each other by removing appropriate circlips to enable a vehicle door to be easily removed (or installed) during manufacture or subsequent maintenance of the vehicle.

Obviously, many modifications and variations of the present invention are possible in light of the above teachings. It is therefore to be understood that within the scope of the appended claims, the present invention may be practiced otherwise than as specifically described herein.

What I claim is:

1. A hinge mechanism for hingedly interconnecting two components together, comprising:
    a first hinge member including means for attachment to a first one of said two components;
    a second hinge member including means for attachment to a second one of said two components;
    pivot pin means, defining a hinge axis, for interconnecting said first and second hinge members together such that said first hinge member is hingedly movable with respect to said second hinge member about said hinge axis;
    roller means mounted upon said second hinge member, said second hinge member having slot means defined therein for permitting said roller means to be movable with respect to said second hinge member;
    a support surface defined upon said first hinge member for rollably supporting said roller means of said second hinge member so as to provide controlled hinged movement of said second hinge member relative to said first hinge member; and
    means, directly interconnecting and mounted upon said roller means and said pivot pin means, for directly biasing said roller means with respect to said pivot pin means and for biasing said roller means into surface contact with said support surface of said first hinge member so as to insure said controlled hinged movement of said first hinge member relative to said second hinge member, said pivot pin means having means provided thereon for accommodating and securing said biasing means upon said pivot pin means.

2. A hinge mechanism as set forth in claim 1, further comprising:
    a polymer sleeve disposed about a roller component of said roller means so as to substantially eliminate any noise generated as a result of said roller component of said roller means engaging said support surface.

3. A hinge mechanism as set forth in claim 2, wherein:
    said roller component has a portion, around which the sleeve is fitted, which is formed of a metal material.

4. A hinge mechanism as set forth in claim 2 wherein the sleeve is formed from PTFE.

5. A hinge mechanism as set forth in claim 2 wherein the sleeve is formed from Nylon.

6. A hinge mechanism as set forth in claim 2 wherein the roller component comprises a core of metal which is formed with an annular recess, and the sleeve is disposed within the recess.

7. A hinge mechanism as set forth in claim 6, wherein the sleeve includes an axial slot so as to permit said sleeve to be snap-fitted upon said roller component and within said annular recess.

8. A hinge mechanism as set forth in claim 2 wherein the sleeve is snap-fitted on the roller component.

9. A hinge mechanism as set forth in claim 1, wherein:
    said hinge mechanism comprises a vehicle door hinge mechanism wherein said first hinge member is attached to a vehicle door comprising said first one of said two components, and said second hinge member is attached to a vehicle body comprising said second one of said two components.

10. A hinge mechanism as set forth in claim 1, wherein:
    said support surface comprises a cam support surface having at least one cam recess defined therein for housing said roller means at a predetermined position with respect to said cam support surface whereby said first hinge member is releasably retained at said predetermined position with respect to said second hinge member.

11. A hinge mechanism as set forth in claim 10, wherein:
    said at least one cam recess comprises three cam recesses defined within said cam support surface whereby when said roller means is respectively releasably retained within first, second, and third ones of said three recesses, said first hinge member is releasably retained at open, intermediate, and closed positions with respect to said second hinge member.

12. A hinge mechanism as set forth in claim 1, wherein:
said pivot pin means defining said hinge axis comprises a pair of axially spaced pivot pins;
each one of said first and second hinge members comprises a substantially C-shaped housing comprising a base portion and oppositely disposed, axially spaced flanged portions, said pair of axially spaced pivot pins being disposed within said axially spaced flanged portions; and
clip means are provided for retaining said pivot pins within said axially spaced flanged portions of said first and second hinge members.

13. A hinge mechanism as set forth in claim 1, wherein:
said roller means comprises an axle disposed parallel to said hinge axis, and a roller component rotatably mounted upon said axle; and
said means for biasing said roller means comprises leaf spring means interconnecting said pivot pin means and said axle.

14. A hinge mechanism for hingedly interconnecting two components together, comprising:
a first hinge member including means for attachment to a first one of said two components;
a second hinge member including means for attachment to a second one of said two components;
pivot pin means, defining a hinge axis, for interconnecting said first and second hinge members together such that said first hinge member is hingedly movable with respect to said second hinge member about said hinge axis;
roller means mounted upon a roller axle disposed within said second hinge member such that said roller axle is disposed parallel to said hinge axis, said second hinge member having slot means defined therein for permitting said roller axle to be movable with respect to said second hinge member;
support surface means defined upon said first hinge member for rollably supporting said roller means of said second hinge member so as to provide controlled hinged movement of said first hinge member relative to said second hinge member; and
means, directly interconnecting and mounted upon said roller axle and said pivot pin means, for directly biasing said roller axle with respect to said pivot pin means and for biasing said roller means into surface contact with said support surface means of said first hinge member so as to insure said controlled hinged movement of said first hinge member relative to said second hinge member, said pivot pin means having means provided thereon for accommodating and securing said biasing means upon said pivot pin means.

15. A hinge mechanism as set forth in claim 14, further comprising:
a polymer sleeve disposed about said roller means so as to substantially eliminate any noise generated as a result of said roller means rollably engaging said support surface means.

16. A hinge mechanism as set forth in claim 15, wherein:
said roller means comprises a metal core; and said polymer sleeve comprises a material selected from the group of PTFE and Nylon.

17. A hinge mechanism as set forth in claim 14, wherein:
said hinge mechanism comprises a vehicle door hinge mechanism wherein said first hinge member is attached to a vehicle door comprising said first one of said two components, and said second hinge member is attached to a vehicle body comprising said second one of said two components; and
each one of said first and second hinge members comprises a substantially C-shaped housing comprising a base portion and oppositely disposed, axially spaced flanged portions; said pivot pin means being disposed within said axially spaced flanged portions of both said first and second hinge members; said roller axle is mounted within said flanged portions of said second hinge member and said roller means comprises a pair of axially spaced rollers; and said support surface means comprises a pair of axially spaced, cam support surfaces formed upon said axially spaced flanged portions of said first hinge member wherein each cam support surface comprises three cam recesses for releasably housing said rollers at three predetermined positions such that said first hinge member, and said vehicle door to which said first hinge member is attached, is releasably retained at open, intermediate, and closed positions, respectively, with respect to said second hinge member and said vehicle body to which said second hinge member is attached.

18. A hinge mechanism as set forth in claim 14, wherein:
said means for biasing said roller means comprises leaf spring means interconnecting said pivot pin means and said roller axle.

19. A hinge mechanism for hingedly interconnecting two components together, comprising:
a first hinge member including means for attachment to a first one of said two components;
a second hinge member including means for attachment to a second one of said two components;
pivot pin means, defining a hinge axis, for interconnecting said first and second hinge members together such that said first hinge member is hingedly movable with respect to said second hinge member about said hinge axis;
roller means mounted upon a roller axle disposed within said second hinge member such that said roller axle is disposed parallel to said hinge axis, said second hinge member having slot means defined therein for permitting said roller axle to be movable with respect to said second hinge member;
support surface means defined upon said first hinge member for rollably supporting said roller means of said second hinge member so as to provide controlled hinged movement of said first hinge member relative to said second hinge member;
means, directly interconnecting and mounted upon said roller axle and said pivot pin means, for directly biasing said roller axle toward said pivot pin means and for biasing said roller means into surface contact with said support surface means of said first hinge member so as to insure said controlled hinged movement of said first hinge member relative to said second hinge member, said pivot pin means having means provided thereon for accommodating and securing said biasing means upon said pivot pin means; and a polymer sleeve disposed about said roller means so as to substantially eliminate any noise generated as a result of said roller means rollably engaging said support surface means of said first hinge member as said first hinge member is hingedly moved with respect to said second hinge member.

20. A hinge mechanism as set forth in claim 19, wherein:

said roller means comprises a metal core; and
said polymer sleeve comprises a material selected from the group of PTFE and Nylon.

21. A hinge mechanism as set forth in claim 19, wherein:

said hinge mechanism comprises a vehicle door hinge mechanism wherein said first hinge member is attached to a vehicle door comprising said first one of said two components, and said second hinge member is attached to a vehicle body comprising said second one of said two components; and each one of said first and second hinge members comprises a substantially C-shaped housing comprising a base portion and oppositely disposed, axially spaced flanged portions; said pivot pin means is disposed within said axially spaced flanged portions of both said first and second hinge members; said roller axle is mounted within said flanged portions of said second hinge member and said roller means comprises a pair of axially spaced rollers; and said support surface means comprises a pair of axially spaced, cam support surfaces formed upon said axially spaced flanged portions of said first hinge member wherein each cam support surface comprises three cam recesses for releasably housing said rollers at three predetermined positions such that said first hinge member, and said vehicle door to which said first hinge member is attached, is releasably retained at open, intermediate, and closed positions, respectively, with respect to said second hinge member and said vehicle body to which said second hinge member is attached.

22. A hinge mechanism as set forth in claim 19, wherein:

said means for biasing said roller means comprises leaf spring means interconnecting said pivot pin means and said roller axle.

23. A vehicle door hinge mechanism for hingedly interconnecting a vehicle door to a vehicle body, comprising:

a first hinge member including means for attachment to said vehicle door;
a second hinge member including means for attachment to said vehicle body;

pivot pin means, defining a hinge axis, for interconnecting said first and second hinge members together such that said first hinge member and said vehicle door are hingedly movable with respect to said second hinge member and said vehicle body about said hinge axis;

roller means mounted upon a roller axle disposed within said second hinge member such that said roller axle is disposed parallel to said hinge axis, said second hinge member having slot means defined therein for permitting said roller axle to be movable with respect to said second hinge member;

cam support surface means defined upon said first hinge member for rollably supporting said roller means of said second hinge member and comprising three cam recesses for releasably housing said roller means at three predetermined positions such that said first hinge member and said vehicle door are releasably retained at open, intermediate, and closed positions, respectively, with respect to said second hinge member and said vehicle body when said first hinge member and said vehicle door are hingedly moved with respect to said second hinge member and said vehicle body; and means, directly interconnecting and mounted upon said roller axle and said pivot pin means, for directly biasing said roller axle toward said pivot pin means and for biasing said roller means into surface contact with said cam support surface means, and within said cam recesses of said cam support surface means, so as to insure controlled hinged movement of said first hinge member and said vehicle door with respect to said second hinge member and said vehicle body, said pivot pin means having means provided thereon for accommodating and securing said biasing means upon said pivot pin means.

24. A hinge mechanism as set forth in claim 23, wherein:

a polymer sleeve is disposed about said roller means so as to substantially eliminate any noise generated as a result of said roller means rollably engaging said cam support surface means.

25. A hinge mechanism as set forth in claim 24, wherein:

said roller means comprises a metal core; and
said polymer sleeve comprises a material selected from the group of PTFE and Nylon.

26. A hinge mechanism as set forth in claim 23, wherein:

said means for biasing said roller means comprises leaf spring means interconnecting said pivot pin means and said roller axle.

* * * * *